Feb. 6, 1962     L. A. WILKINSON     3,019,705
COARSE AND FINE ADJUSTMENT MECHANISM FOR MICROSCOPES
Filed Dec. 13, 1957     3 Sheets-Sheet 1

INVENTOR
LEONARD A. WILKINSON
BY
Herbert C. Kimball
ATTORNEY

Feb. 6, 1962 — L. A. WILKINSON — 3,019,705
COARSE AND FINE ADJUSTMENT MECHANISM FOR MICROSCOPES
Filed Dec. 13, 1957 — 3 Sheets-Sheet 2
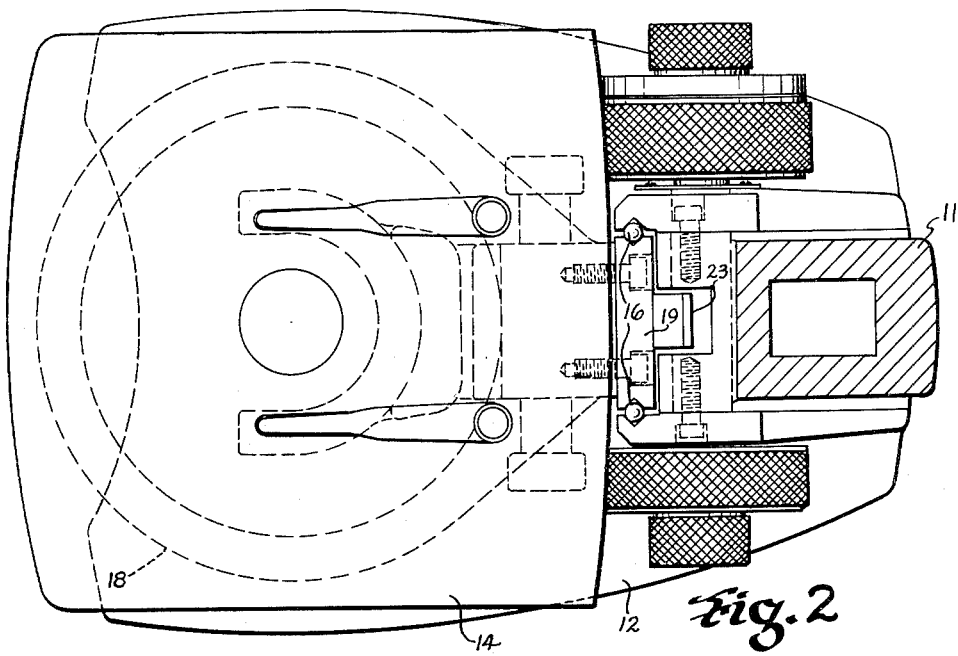
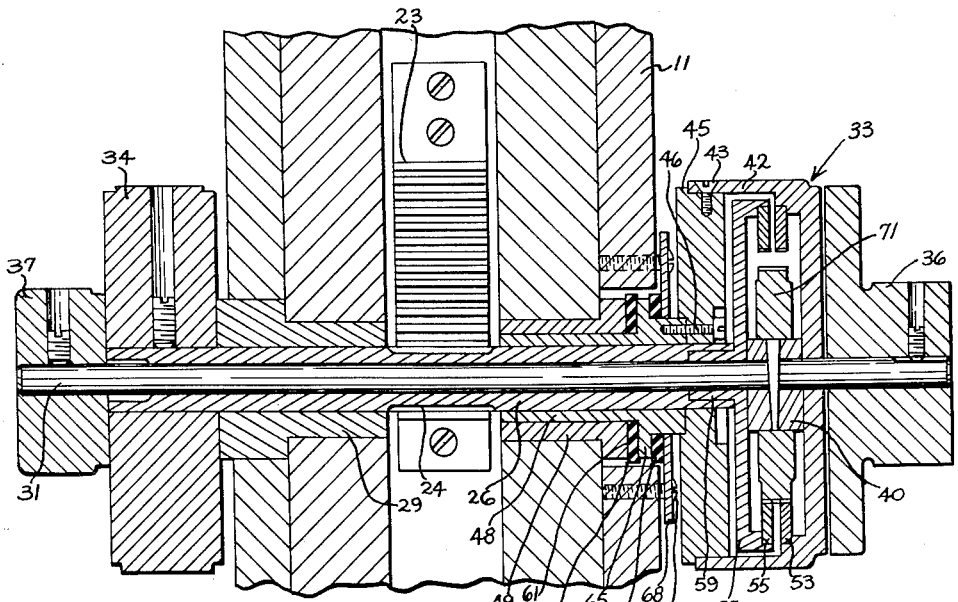
INVENTOR
LEONARD A. WILKINSON
BY
Herbert C. Kimball
ATTORNEY INVENTOR
LEONARD A. WILKINSON
BY
Herbert C. Kimball
ATTORNEY United States Patent Office 3,019,705
Patented Feb. 6, 1962

3,019,705
COARSE AND FINE ADJUSTMENT MECHANISM
FOR MICROSCOPES
Leonard A. Wilkinson, Snyder, N.Y., assignor to American Optical Company, Southbridge, Mass., a voluntary association of Massachusetts
Filed Dec. 13, 1957, Ser. No. 702,606
3 Claims. (Cl. 88—39)

This invention relates to improved coarse and fine adjustment mechanism for microscopes. The invention is applicable to any adjustment of a member of a microscope where both rapid and slow excursions of the member are called for. The invention is illustrated in the following disclosure as applied to raising and lowering mechanism for focusing the microscope.

In the better class of microscopes, particularly where a high degree of refinement goes into the raising and lowering mechanism whereby the parts are brought into adjustment, it is common practice to effect rapid movement through a coarse adjustment which includes its own ways and to effect the sensitive, accurate focusing movements through a fine adjustment which is complete with its own ways.

It is an object of the present invention to simplify the raising and lowering mechanism so as to eliminate the duplication of ways by driving the mechanism through planetary gearing, and to provide means for adjusting the raising and lowering mechanism having a set of coaxial coarse and fine control knobs on each side of the microscope for driving the raising and lowering mechanism through the planetary gearing.

The users of the better class of microscopes are intent upon the information to be obtained from the slide or other object under scrutiny; and control of the knobs of the adjustment mechanism, and more particularly the fine adjustment, is essentially a sub-conscious effort. If the user perceives with the fingers any erratic action of the knob, or if the action of the gears is such as to transmit vibration to the user's fingers, the concentration of the user on seeing is disturbed and the "feel" of the adjustment is unsatisfactory to the user.

It is a further object of the present invention to provide coarse and fine adjustment mechanism having coaxial controls which cooperate with planetary gearing whose operation is advantageous from the point of view of "feel."

In line with the broadest concept of the invention, of eliminating the duplicate set of ways, both the rapid and the slow excursions of a microscope member such as the stage or the objective are effected on the same set of ways by the same mechanism adjusted at either a high rate of speed or at a relatively low rate of speed, depending upon which control knobs are used by the observer using the microscope. The problem then is to adjust the same element of the raising and lowering mechanism at both a rapid rate for coarse adjustments and at a slow rate for fine adjustments. For instance, if the raising and lowering mechanism is of the rack and pinion type, the pinion may be driven from or directly mounted on a shaft of the adjustment means. For present purposes this shaft of the adjustment means is in the form of a tubular shaft which term is used generically to include a sleeve or other hollow driving member. By using a tubular shaft, a second shaft may be extended through the hollow in the first, and the observer is thus given control of both of these coaxial shafts on both sides of the microscope. My invention makes this simplification of the raising and lowering mechanism possible by interconnecting the two coaxial shafts by planetary gearing, whereby a direct turning of the tubular shaft (turning either the control knob on the right side or the control knob on the left side of the microscope) gives coarse adjustment, and indirect turning through the planetary gearing (i.e. by turning either of the control knobs on the inner shaft) gives fine adjustment.

In the drawings which illustrate my invention:

FIG. 2 is a plan view of the microscope stage of FIG. 1 together with its adjustment mechanism;

FIG. 3 is a detail sectional view through one form of adjustment mechanism;

Figure 1:
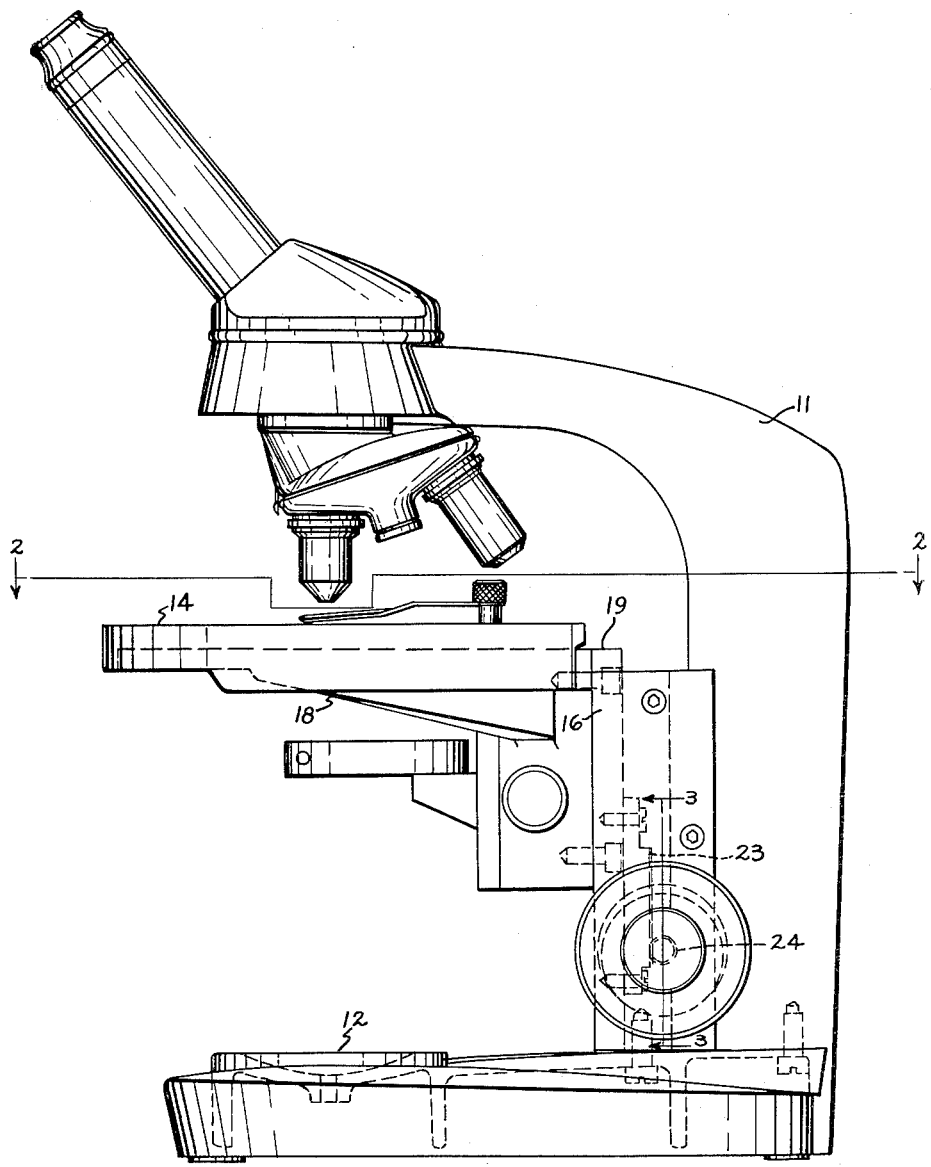
FIG. 1 is a view in side elevation of a research microscope whose stage is raised and lowered by adjustment mechanism embodying the present invention.

The microscope selected for illustration herein supports the microscope objective on an arm 11 carried by the base 12. The object to be viewed is supported on a stage 14 which is raised and lowered by adjustment mechanism of my improved type to bring the object into focus. The stage raises and lowers on two ball-bearing ways indicated at 16 in FIGURE 2 in response to the turning of the control knobs of the adjustment mechanism. In the form shown in FIGS. 1 and 2, the frame of the stage is in the shape of a ring 18 carried by a ball bearing slide plate 19. The ball-bearing ways 16 straddle the slide plate 19 and are fastened to either side of arm 11. A rack 23 fixed to the slide plate 19 is engaged by a gear 24, the raising and lowering of the stage 14 being brought about by rotation of gear 24.

The improvement brought about by the present invention is the adjustment of the raising and lowering mechanism by means acting at coarse adjustment speed and at fine adjustment speed on an element of the raising and lowering mechanism, of which the gear 24 is a representative example. As a simple illustration, the teeth of gear 24 may be directly cut on the tubular shaft 26 of the adjusting means. This tubular shaft 26, as shown, is journalled in two bushings 48 and 29 in the lower end of the microscope arm 11 where the knobs may be manipulated with the observer's arms in relaxed position on the table or other support for the microscope. Through the tubular shaft 26 is extended a second shaft 31, with the above mentioned advantage that with the left hand or the right hand, whichever is convenient, the observer may make either fine or coarse adjustments depending upon which shaft he turns.

The planetary gearing interconnecting the coaxial shafts may be of a type which locks and rotates bodily with tubular shaft 26 when coarse adjustments are to be made, and which drives the tubular shaft 26 at a reduced rate when the second shaft 31 is turned by the observer. Such a type of gearing is shown in FIG. 3, the gearing being housed in the control knob 33 at one end of the shaft 26, it being understood that this planetary gearing could be housed in this knob, in the control knob 34 at the other end of shaft 26, or within upright arm 11 between these knobs. The inner (fine adjustment) shaft 31 extends beyond the knob (33 or 34 respectively) at each side of the microscope so as to carry a fine adjustment knob 36 at one end and a corresponding knob 37 at the other.

Turning of either knob 36 or knob 37 rotates the inner shaft 31 which carries with it an eccentric 40. The orbital gear or gears carried by the eccentric 40 mesh with two coaxial sun gears, and due to the difference between the two sun gears in the gear ratio each has with the orbital gear or gears, a reduced speed of turning of the shaft 26 is brought about. It have discovered that important advantages in the "feel" of the adjustment are attained by employing coaxial sun gears which have their gear teeth (differing so as to give the above specified difference in gear ratio) formed internally so as to mesh with the gear or gears which travel orbitally as moved by the eccentric 40. This arrangement reduces disturbing vibration which tends to arise from the rolling of the orbital gears through their orbits, and accomplishes a drive of the raising and lowering mechanism through planetary gearing with the smoothness of "feel" which characterizes the best fine adjustment mechanism of conventional design.

Referring to FIG. 3, which shows the planetary gearing housed in the control knob 33, the latter is in the form of a sleeve 42 fixed by screws 43 at its inner edge to a circular flange plate 45 which in turn is secured by screws 46 to the bushing 48. The bushing 48 carrying the sleeve 42 is rotatably mounted in a bushing 49 fixed in the arm 11, and is also rotatable relative to the tubular shaft 26. The other end portion of the latter is rotatably mounted in the bushing 29 fixed in the arm 11. The coarse adjustment knob 34 is fixed to this end portion. As above mentioned, the fine adjustment shaft 31 extends through the tubular shaft 26 with the result that the fine adjustment knobs 36 and 37 are coaxial with the coarse adjustment knobs 33 and 34.

My improved arrangement of planetary gearing employs coaxial sun gears having internal teeth. To a rabbet or recess in the sleeve 42 is fixed the sun gear 53 having a smaller number of teeth than the coaxial sun gear 55 which is fixed to a carrier 57. The hub 59 of the carrier 57 is fixed in the end of the tubular shaft 26 so as to drive the latter when the sleeve 42 is held stationary. Since the bushing 48 is secured to the flange plate 45 by screws 46, and the sleeve 42 is secured to flange plate 45 by screws 43, it is possible to frictionally hold the sleeve 42 by frictionally engaging the bushing 48.

In FIG. 3 is shown the braking means for frictionally holding the bushing 48. The end surface 61 of the stationary bushing 49 provides the reaction for the brake, and friction is developed by a nylon washer 63 interposed between the surface 61 and a flange 65 on the rotatable bushing 48. A second nylon washer 66 is interposed between the flange 65 and a plate 68 of spring metal which is secured to the microscope arm 11 by screws 69. By tightening down the screws 69, the proper amount of braking pressure may be applied to the opposite sides of the flange 65. This braking pressure is regulated so that the normal force required to lift the stage 14 and overcome the friction in the adjustment mechanism gearing is delivered when the fine adjustment shaft 31 is turned. The braking pressure is kept light for two reasons. First, this braking pressure must be overcome whenever the shaft 26 is turned directly by knob 33 or by knob 34 (the planetary gearing locking at this time so that it is turned bodily as one unit) for coarse adjustments. Second, this braking pressure should be overcome whenever the member being adjusted (herein the stage 14) encounters an obstacle. This latter class of slippage provides a valuable safety factor protecting the objective or other parts of the microscope in case parts of the microscope such as stage and objective are forced against each other through oversight.

Figure 4:
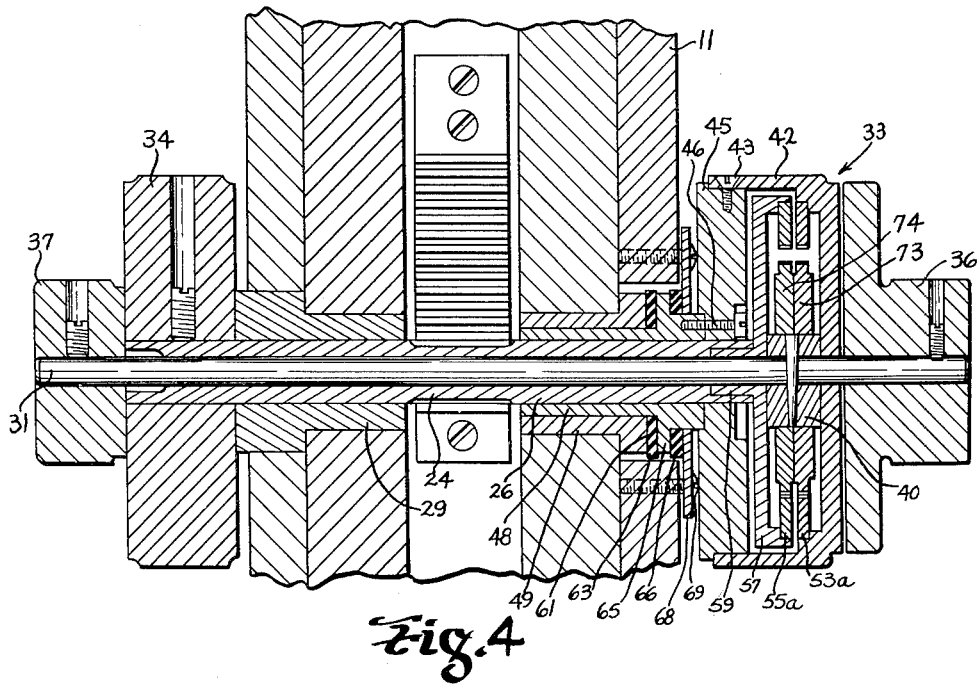
FIG. 4 is a similar detail sectional view showing a modified form of the adjustment mechanism.

The orbital gear member which meshes with the coaxial sun gears may be a single spur gear as in FIG. 3 or two such gears connected to rotate together as in FIG. 4. In the embodiment shown in FIG. 3, a single spur gear 71 is rotatably mounted on the eccentric 40 fixed to the fine adjustment shaft 31. In the embodiment shown in FIG. 4, two spur gears 73 and 74 of slightly different diameter are connected for rotation as a unit, these gears being rotatably mounted on the eccentric 40 carried by the fine adjustment shaft 31. The advantage of the arrangement shown in FIG. 4 will be apparent to those skilled in the art of gearing, as the pitch diameter of the teeth of gear 73 is determined by the pitch diameter of the teeth of the sun gear with which it meshes. The same is true with regard to the pitch diameter of the teeth of gear 74.

As the fine adjustment shaft is turned, the eccentric 40 moves the single spur gear 71 of FIG. 3 or the two spur gears 73 and 74 through the orbit which causes meshing with the two sun gears 53 and 55 or 53a and 55a. If the braking means applied to the flange 65 of the bushing 48 hold the sleeve 42 stationary, the amount of movement of the tubular shaft 26 is determined by the difference in the gear ratio of sun gear 55 which is driven and of sun gear 53 which is held stationary with sleeve 42. The motion of the eccentric 40 and the rolling of spur gear 71 or spur gears 73 and 74 within the sun gears is hardly appreciable to the operator, and accordingly the "feel" of the fine adjustment equals in smoothness the "feel" of the best fine adjustments now available, with the improvement that the coarse and fine adjustment control knobs are coaxial and the ratio between the two adjustment speeds of a high order if so desired.

Figure 5:
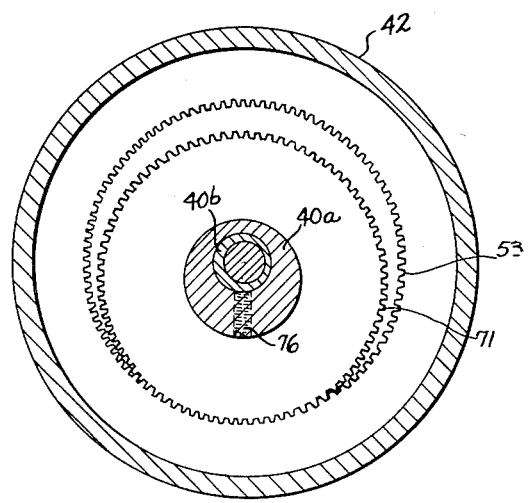
FIG. 5 is a sectional view through a modified eccentric whose eccentricity is adjustable.

In FIG. 5 is shown a still further refinement for promoting smooth operation of the planetary gearing while avoiding back lash. The eccentric 40 is made in two parts, an outer part 40a carried on a hub part 40b. The part 40b is itself an eccentric, and by adjusting its orientation (by means of set screw 76) relative to part 40a, the eccentricity of the whole can be adjusted for bringing about a closer mesh of the orbital gear or gears with the coaxial sun gears.

For the user, the operation of the adjustment mechanism is quite simple. With either hand, fine adjustment can be effected by turning knob 36 or 37 as the case may be, with the result that the orbital gear is carried about within the coaxial sun gears 53 and 55. Because of the difference in the gear ratios with respect to the gears 53 and 55, the gear carrier 57 is driven to effect a slow rotation of shaft 26 and a fine adjustment of the microscope.

With either hand, coarse adjustment can be effected by turning knob 33 or 34, as the case may be, with the result that the planetary gearing locks and the shaft 26 is turned directly. This brings about coarse adjustment of the microscope.

With either adjustment of the microscope the operation of the planetary gearing is remarkably smooth and the "feel" of the adjustment mechanism is comparable to the "feel" which characterizes the best fine adjustment mechanism of conventional design.

I claim:

1. In a microscope having raising and lowering mechanism, driving means therefor comprising a tubular coarse adjustment shaft operatively connected to said mechanism to drive the same, said shaft extending through the microscope and projecting on both sides thereof, a coarse adjustment knob on each projecting portion of said tubular shaft for rotation of said shaft by either hand selectively of the operator, a fine adjustment shaft extending through said tubular shaft and projecting at both ends thereof, planetary gearing connecting said fine adjustment shaft in driving relation to said tubular shaft including two adjacent coaxial internal gears, one in fixed relation to said tubular shaft and the other in fixed relation to a brake member, said microscope having a reaction portion cooperating with said brake member, an eccentric on and rotating with said fine adjustment shaft, and an orbitally movable gear member surrounding said fine adjustment shaft and rotatably mounted on said eccentric, said gear member meshing with both said coaxial internal gears so as to effect a differential drive of said tubular shaft relative to said braked internal gear, and a fine adjustment knob on each projecting portion of said fine adjustment shaft, each fine adjustment knob being positioned on the outer side of its respective coarse adjustment knob.

2. In a microscope having raising and lowering mechanism, driving means therefor comprising a tubular coarse adjustment shaft operatively connected to said mechanism to drive the same, said shaft extending through the microscope and projecting on both sides thereof, a coarse adjustment knob on each projecting portion of said tubular shaft for relatively rapid operation of said driving means by either hand selectively of the operator, a fine adjustment shaft extending through said tubular shaft and projecting on both sides thereof, a control knob on each projecting portion of said fine adjustment shaft for slow speed adjustment of said raising and lowering mechanism, and planetary gearing connecting said fine adjustment shaft in driving relation to said tubular shaft including two adjacent coaxial internal gears, one in fixed relation to said tubular shaft and the other in fixed relation to a brake member, said microscope having a reaction portion cooperating with said brake member, an eccentric on and rotating with said fine adjustment shaft, and a pair of spur gears surrounding said fine adjustment shaft and rotatably mounted on said eccentric said pair of spur gears being orbitally movable thereby so as to mesh each with one of said coaxial internal gears and effect a differential drive of said tubular shaft relative to said braked internal gear, the gear ratio of one internal gear to its meshing internal gear differing from the gear ratio of the other gear couple.

3. In a microscope having raising and lowering mechanism, driving means therefor comprising a tubular coarse adjustment shaft having a pinion operatively connecting said driving means to said mechanism, said tubular shaft extending through the microscope and projecting on both sides thereof, a coarse adjustment knob on each projecting portion of said tubular shaft for relatively rapid operation of said mechanism by either hand selectively of the operator, a fine adjustment shaft extending through said tubular shaft and projecting at both ends thereof, a fine adjustment knob on each projecting end of said fine adjustment shaft, and planetary gearing connecting said fine adjustment shaft in driving relation to said tubular shaft including two adjacent coaxial internal gears, one in fixed relation to said tubular shaft and the other in fixed relation to a brake member, said microscope having a reaction portion cooperating with said brake member, an eccentric on and rotating with said fine adjustment shaft, and a pair of spur gears surrounding said fine adjustment shaft and meshing one with each of said internal gears, said eccentric rotatably supporting and orbitally moving said pair of spur gears in mesh with said internal gears so as to effect a differential drive of said tubular shaft relative to said braked internal gear, each fine adjustment knob being positioned on the outer side of its respective coarse adjustment knob.

References Cited in the file of this patent

UNITED STATES PATENTS

| | | |
|---|---|---|
| 2,148,576 | Ott | Feb. 28, 1939 |
| 2,167,677 | Petersen | Aug. 1, 1939 |
| 2,828,649 | Boerdijk et al. | Apr. 1, 1958 |
| 2,869,373 | Erbe et al. | Jan. 20, 1959 |
| 2,877,651 | Erbe et al. | Mar. 17, 1959 |

FOREIGN PATENTS

| | | |
|---|---|---|
| 504,639 | Italy | Dec. 13, 1954 |
| 930,179 | Germany | July 11, 1955 |
| 951,537 | Germany | Oct. 31, 1956 |